(No Model.)

J. P. WOOTEN.
TELEGRAPHY.

No. 509,066.

Patented Nov. 21, 1893.

5 Sheets—Sheet 1.

Witnesses
James F. Duhamel
Horace A. Dodge.

JULIEN P. WOOTEN,
Inventor,
by Dodge Sons
Atty.

(No Model.) 5 Sheets—Sheet 2.
J. P. WOOTEN.
TELEGRAPHY.
No. 509,066. Patented Nov. 21, 1893.
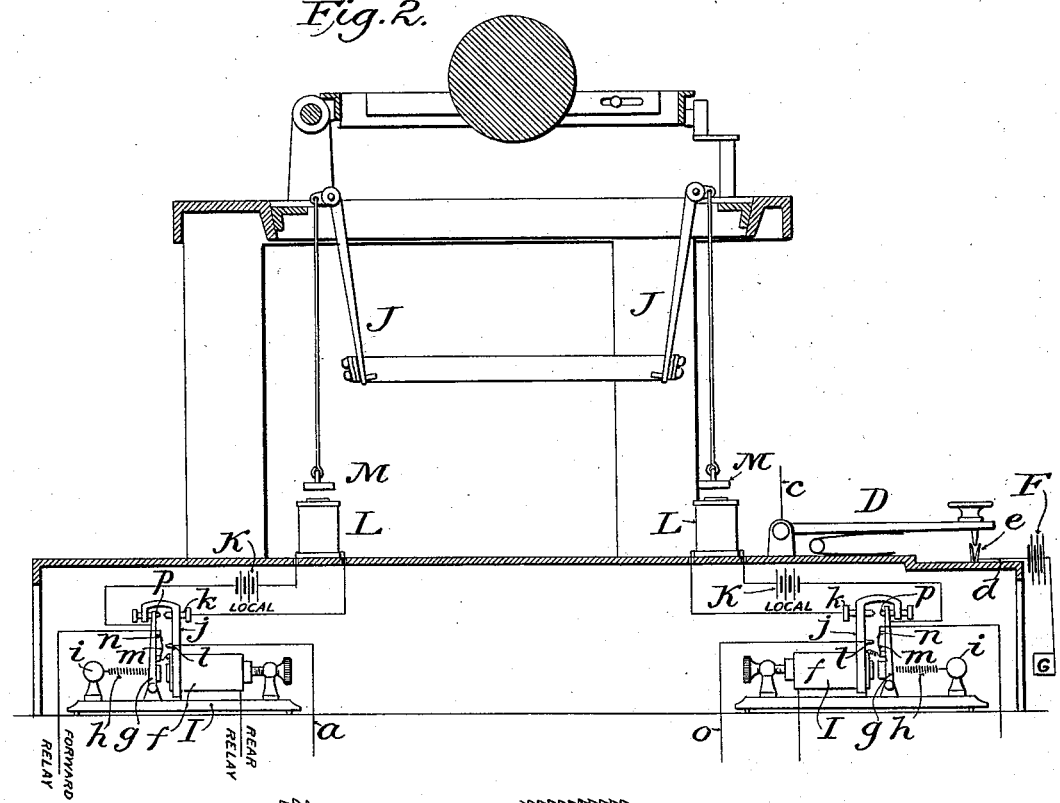
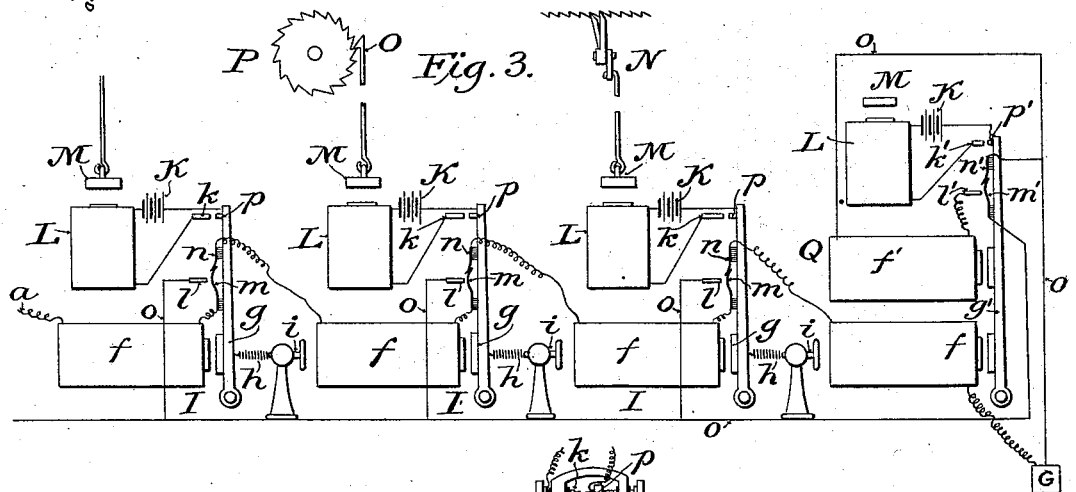
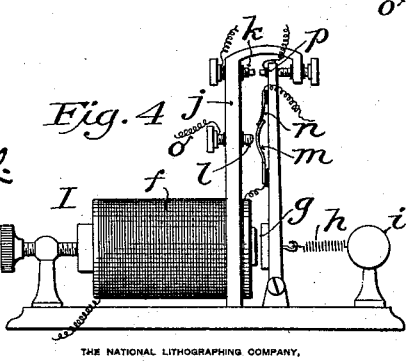
Witnesses:
James F. Duhamel
Horace A. Dodge
JULIEN P. WOOTEN,
Inventor,
by Dodge & Sons
Attys.

(No Model.) 5 Sheets—Sheet 3.

J. P. WOOTEN.
TELEGRAPHY.

No. 509,066. Patented Nov. 21, 1893.

Witnesses:
James F. Duhamel
Horace A. Dodge.

JULIEN P. WOOTEN, Inventor,
by Dodge Sons Attys.

(No Model.)

5 Sheets—Sheet 4.

J. P. WOOTEN.
TELEGRAPHY.

No. 509,066.

Patented Nov. 21, 1893.

Witnesses:
James F. Duhamel.
Horace A. Dodge.

JULIEN P. WOOTEN,
Inventor,
by Dodge & Sons
Attys.

(No Model.)　　　　　　　　　　　　　　　　　5 Sheets—Sheet 5.
J. P. WOOTEN.
TELEGRAPHY.
No. 509,066.　　　　　　　　　　Patented Nov. 21, 1893.
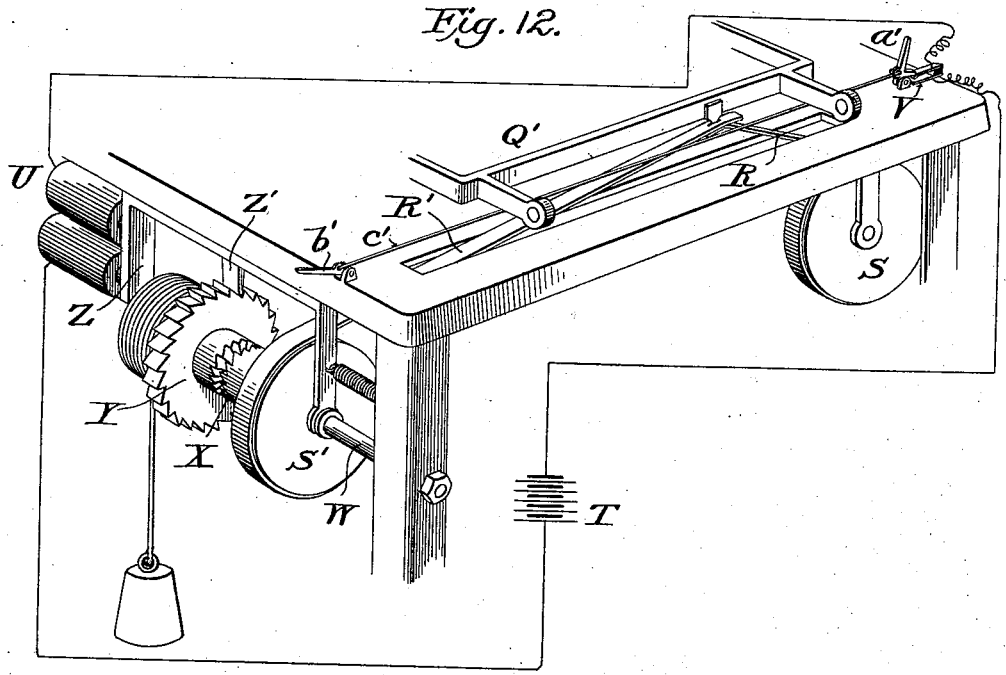
Witnesses:
James T. Duhamel
Horace A. Dodge.
JULIEN P. WOOTEN,
Inventor,
by Dodge Son,
Attys.

UNITED STATES PATENT OFFICE.

JULIEN P. WOOTEN, OF BAINBRIDGE, GEORGIA.

TELEGRAPHY.

SPECIFICATION forming part of Letters Patent No. 509,066, dated November 21, 1893.

Application filed November 18, 1892. Serial No. 452,426. (No model.)

*To all whom it may concern:*

Be it known that I, JULIEN P. WOOTEN, a citizen of the United States, residing at Bainbridge, in the county of Decatur and State of Georgia, temporarily residing at Washington, District of Columbia, have invented certain new and useful Improvements in Apparatus for Telegraphing, of which the following is a specification.

My invention relates to a novel apparatus for telegraphic communication, the object of which is to enable messages to be sent and received by mechanism resembling in its general features that of the ordinary type-writing machines; that is to say, the message is sent by the manipulation of keys corresponding to those of a type-writing machine, and is received and printed by a machine provided with type-bars acting in essentially the same manner as those of the ordinary type-writing machine.

Figure 1:
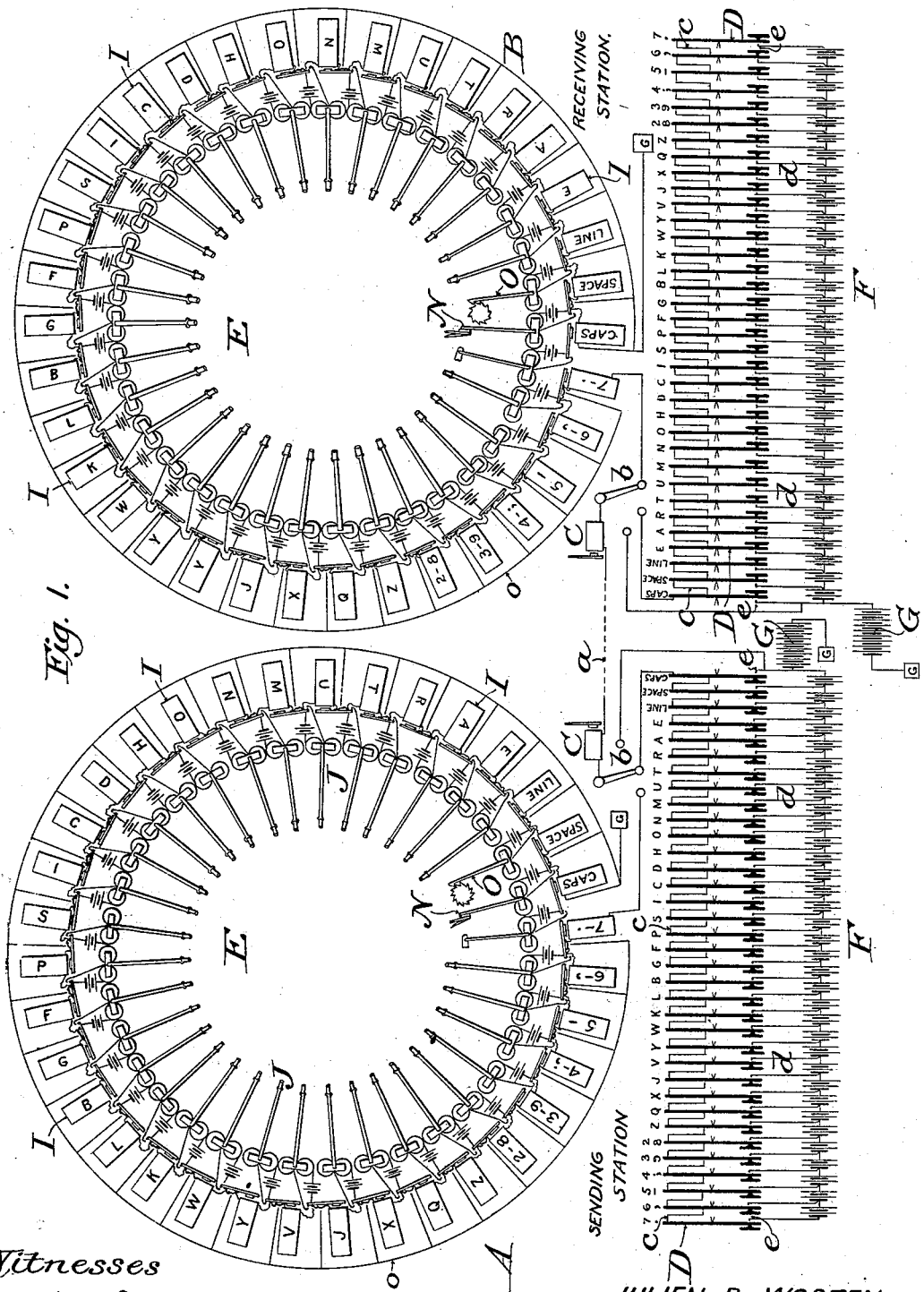

In the accompanying drawings, which illustrate my invention,—Figure 1 is a diagram designed to illustrate the principle, and, in a general way, the mechanical devices incident to my invention; Fig. 2, a sectional elevation of the receiving instrument; Fig. 3, a diagrammatic view illustrating the arrangement of relays for actuating or controlling the action of the type-bars, the line-spacer, the letter-spacer and the shifting frame or carriage by which the machine is caused to print capitals; Fig. 4, a side elevation of one of the relays; Figs. 5 to 11, views illustrating different arrangements of circuits and connections hereinafter explained; and Fig. 12, a perspective view of the carriage-receding mechanism.

By the aid of my invention messages are transmitted from one point to another over a single wire and printed at a distant station or series of stations, as may be desired.

Referring again to the drawings, and particularly to Fig. 1, the principle involved will be explained. In said figure, A indicates a sending-station and B, a receiving station connected by a line or conductor, $a$, at each end of which is a common Morse sounder C, and a suitable switch $b$, by which a circuit may be established either through the line $a$, the two sounders C, and the ground; or through said line and the sending and receiving instruments of the two stations as required,—the purpose of the sounders C being merely to enable the operators to make such preliminary communications as may be desirable, preparatory to beginning the use of the main instruments. To enable the circuit of the Morse instruments C to be thus closed for preliminary signaling, there are provided two contacts $b^2$, in addition to those used for connecting the printing instruments proper, each of said contacts $b^2$ connecting by a conductor $b^3$ with one terminal of one or the other of the grounded group of cells G. The switches $b$ being placed upon the contacts $b^2$ at both stations, a circuit is established from the group of cells G at one station, through conductor $b^3$, contact $b^2$, switch $b$ and Morse instrument C of said station by line $a$, to Morse instrument C of the other station, thence by switch $b$, contact $b^2$, conductor $b^3$ to group of cells G at said second station, thence to ground and by ground back to the grounded terminal of group of cells G at the first station. Obviously, a common form of key with means of permanently closing the circuit may be used, as the "cap" key of each instrument, in which case the contacts $b^2$ will be unnecessary.

D indicates a key, of which there are as many at each station as there are relays in the printing instruments E. Each key or lever D is permanently connected by a conductor, $c$, with the next lever, as indicated in Fig. 1, and the last lever of the series at the sending station connects, through the switch, $b$, with the line, $a$.

F indicates a series of battery cells arranged in groups, the number in each group being determined by the length of the circuit over which messages are to be sent, and by like circumstances or conditions. These cells or groups of cells at each station are connected to constitute one continuous series, and each group has a conductor, $d$, extending from it to a contact-point, $e$, located directly in the path of the lever D corresponding to such cell or group of cells. The conductor $d$, which proceeds from the last cell or group of cells F of the series passes thence to another group of cells G, as well as to its contact point, $e$, and thence to the ground, as indicated in Fig. 1. From this arrangement it will be seen that if any key-lever D be depressed so as to establish contact with the point e, a circuit will be established from the cells F, through conductor d, contact-point e, lever D, intermediate conductors c, and levers D by line a, and switches b, to the printing instrument E at the distant station, whence through suitable connections hereinafter described it will pass to the ground, and by the ground back to the cells G, F.

The construction and arrangement of the key-levers D and the circuit connections will be readily understood upon referring to Fig. 2, in which they are shown on a larger scale than is practicable in Fig. 1.

In each of the several figures of the drawings, I indicates a relay, of which there is one for each type-bar J to be actuated, and one for the letter-spacing mechanism, another for the line-spacer and one for shifting the platen to cause the printing of capitals.

The construction of the relay I is illustrated in Fig. 2, and more clearly in Fig. 4, and it consists of an electro-magnet, $f$, a swinging armature $g$, a spring $h$, the tension of which may be adjusted as required by a set-screw $i$; a standard or yoke $j$, carrying insulated contact-points $k$ and $l$, and a circuit-maker and breaker carried by the armature $g$, and consisting of two insulated spring fingers $m$ and $n$ which are normally in contact, but which, upon the attraction of the armature by the electro-magnet, are separated and caused to interrupt the path normally existing through them for the working circuit. The spring-finger $m$ is electrically connected with the helix of the electro-magnet $f$, which is included in the main or working circuit, and the spring finger $n$ is likewise electrically connected with the helix $f$ of the next succeeding relay so as to afford a path for the working circuit from one to another of the helices of the respective relay magnets as indicated in Fig. 3. When, however, the armature $g$ is attracted by the energizing of its controlling helix, the spring finger $m$ coming into contact with the contact point or stop $l$, effects a separation of the fingers $m$ and $n$, and causes the circuit to be broken at that point, but permits it to continue, by way of finger $m$ and contact point $l$ to a grounded conductor $o$, thereby cutting out of the circuit all the relays beyond the one whose armature is for the moment attracted.

The springs $h$, or any equivalent mechanical resistance which may be applied to the armature $g$ of the respective relays, will each be adjusted to offer a different resistance to the attraction of its armature, the said resistance being proportioned or adjusted to correspond with the strength of the current sent to the particular relay in which it is employed.

Since the key at the extreme left of the sending key board (under the arrangement shown and described), sends the total battery strength to line, and each succeeding key toward the right sends less than the one to its left, the same order should be observed with the mechanical resistances of the receiving instrument; that is to say, the first of the series, beginning at the left or at the point at which the current enters, will have the highest mechanical resistance, and the resistances of the others will decrease progressively toward the last or right hand key.

It will be observed that the number of cells included in the circuit varies with each key actuated or depressed. Thus, beginning at the extreme left of the series of keys at the sending station in Fig. 1, it will be seen that its depression will bring into circuit all the cells F, as well as the cells G; whereas, if the lever representing the character "G," located at about midlength of the series, be depressed, only those cells to the right of said lever will be brought into action, and if the last lever of the series at the extreme right be depressed, only the cells G will be brought into action. From this it appears that each lever D when depressed to complete the circuit will send to the line a different strength of current. If, therefore, the relays of the receiving instrument at the distant point be wound with reference to this different strength of current, and have the mechanical resistance of their armatures adjusted with relation thereto, it will be possible to select the particular relay which it is desired to select at the distant point, by causing its controlling lever to send to the line a current sufficient only to actuate that relay and attract its armature, but insufficient to overcome the mechanical resistance of any intermediate or intervening relay.

For convenience of explanation, and as an approximation to the number actually necessary under average conditions, it may be assumed that there are in each group constituting the series of cells F, ten cells, and with thirty-five keys or levers D, which will be found a convenient number, there will be three hundred and fifty cells in the series. If therefore, the lever D at the extreme left of the series be actuated, the entire three hundred and fifty cells will be called into action and a current of great strength will be sent to line. This current will be sufficient to overcome the mechanical resistance of the armature of the first relay of the receiving instrument, and will consequently cause said armature to be attracted. The instant the armature begins to move, the contact between the spring-fingers $m$ and $n$ being destroyed, the main circuit will be broken at that point and pass directly to the grounded line or conductor $o$, so that all the other relays will be immediately cut out of action, and only the first one rendered operative.

As shown in Figs. 2, 3 and 4, but more plainly in the last named figure, the armature $g$ of each relay carries a contact point $p$, which, coming against the contact point $k$, completes the circuit of a local battery K, in which circuit is included an electro-magnet L, which, by attracting its armature M, actuates one of the series of type-bars J, or such other part as may be controlled by that particular relay and local battery. Upon the release of the lever D last depressed the circuit is destroyed or broken and the parts return to their normal positions. Upon the depression of the next lever D, which for illustration we will assume to be the lever corresponding to the character "R," near the right hand end of the series at the sending station in Fig. 1, a circuit will be established including the five groups of cells F at the right hand end of the series, or fifty cells in all, in addition to the cells G, which are called into action by each key-lever D. The current thus sent to line will be insufficient to overcome the mechanical resistance offered by the armature of any of the relays in the receiving instrument from the first point to the one corresponding to the type-bar "R," but will be sufficient to overcome the resistance of the armature of that relay, consequently attracting said armature, destroying the connection between its contact springs $m$ and $n$, cutting out the relays beyond the one indicated, and grounding the circuit from that point. In this way the local battery K of the relay corresponding to the character "R" is brought into action, and the type-bar J carrying the character "R" is actuated and caused to print its appropriate character. In completing the circuit by the depression of any key of the keyboard, a current is caused to pass through the magnet coils of all the relays of the receiving or reproducing instrument, as otherwise no path would be afforded for the initial completion of the circuit; but practically simultaneous with the completion of the circuit in this manner, occurs the interruption of the circuit through all relays beyond the one intended, and the grounding of the circuit at that point. Still assuming that the key corresponding to letter "R" be depressed in the sending keyboard,—in such case the current would momentarily pass through all the relays of the receiving instrument, and in the absence of any means of prevention, would cause all the relays beyond "R" to close their local circuits and actuate the printing, spacing, or shift devices controlled by them, because each of said relays beyond "R" offers a less mechanical resistance than that of "R," or of those preceding "R." But before the "caps" relay, which is the last of the series and offers the lowest mechanical resistance, can close its local circuit and effect the movement of the shift mechanism, it is cut out of circuit by the movement of the armature of the next preceding or "space" relay; this is cut out by "line" relay; this by the "E" relay, and this by the "A" relay, which brings the grounding of the current back to the "R" relay, the whole operation being instantaneous. Since the current sent to line by depression of the "R" key is insufficient to overcome the mechanical resistance of the armature of any preceding relay, the "R" relay will hold its armature and maintain the closing of the local circuit of said relay so long as the "R" key is depressed. The action thus described is practically instantaneous, and though it might appear uncertain of accomplishment, has many practical demonstrations in existing electrical apparatus, so far as concerns the grounding before other parts can act.

The armatures M of all the type-bars will be arranged to release the letter-spacing mechanism of the printing mechanism in essentially the same manner as is now done in the ordinary type-writing machines, so that there will be no occasion under ordinary circumstances to separately actuate the spacing devices, but at the end of a word such special actuation will be necessary. To provide for such spacing between the words, one of the armatures M is connected with the vibrating space-bar lever N of the type-writing machine as shown in Fig. 3, and the relay controlling this armature will be controlled by one of the levers or finger-keys D in precisely the same manner as the printing characters are controlled. In like manner one of the armatures M will be connected with a hook or dog O to rotate the ratchet wheel P on the end of the platen or paper-roll, so that when a line is completed the roll may be turned to advance the paper the distance necessary for printing a new line. The relay controlling this line-spacing mechanism will be under the control of its own finger-key or lever D, the same as the respective printing characters and word-spacer.

In the Remington type-writing machine, the general construction of which I propose to adopt, each type-bar is provided with two printing characters, and the platen or paper-roll is mounted in a carriage which is shifted from its normal position to such a position as shall cause the capital characters to print. In some cases it is desirable to hold the platen in this latter position for a considerable length of time in order that a word or a number of words may be printed entirely in capitals. To provide for shifting the carriage and for holding it in its shifted position, I include in the circuit the instrument Q, illustrated at the extreme right end of Fig. 3, in which $f$ indicates the first coil or helix of the relay, corresponding to the helices $f$ of the other relays. This helix $f$ is directly connected in the circuit, and the circuit passes normally thence to the ground. The armature $g'$ of the shifting relay Q is provided with an insulated contact point $p'$ which makes connection with another contact $k'$, whereby, upon the attraction of the armature the local battery K is called into action and made to attract the armature M, through which the platen carriage is shifted. The contact point $l'$ instead of connecting directly with the ground, as in the other relays, connects with the coil or helix of a second electro-magnet $f'$ arranged above the first, or in such position that when energized it shall attract and hold the armature $g'$.

As shown in Fig. 3, the grounded line or conductor $o$, which for convenience I designate as the exhaust line, is electrically connected with spring finger $m'$, of armature $g'$, and consequently the current, before passing to the ground, goes through spring-fingers $m'$ and $n'$, and thence to ground. Upon the attraction of armature $g'$ by magnet $f$, spring-finger $m'$ makes electrical connection with contact point $l'$, at the same instant destroying contact with spring-finger $n'$. The exhaust current, under this adjustment of parts, passes by way of spring-finger $m'$ and contact $l'$, through the helix of a second electro-magnet $f'$ of the instrument Q, and thence to ground, and consequently, if the key or lever D controlling instrument Q be depressed and held down, the direct or the exhaust current, one or the other, will, through the intervention of magnet $f$ or $f'$, hold the carriage shifted as long as the key or lever is depressed. As above stated, the conductor $d$ which passes from the last cell or group of cells F of the series, passes thence to another group of cells G as well as to the contact point $e$ of the last or "cap" key, and from said cells G to the ground; hence the depression of any key of the entire series (Fig. 1) the last one to the right or "cap" key as well as the others, brings the group of cells G into circuit, and retains it in circuit so long as the key remains depressed. It will thus be seen that so long as the "cap" key, or last key of the series is depressed, a closed circuit and a battery current for the shift device, are afforded; and the double relay Q provides a path for the direct and the exhaust current during the holding down of the "cap" key. In this way, the release and return of the shifting-armature through the actuation of another key or lever is prevented.

Figure 5:
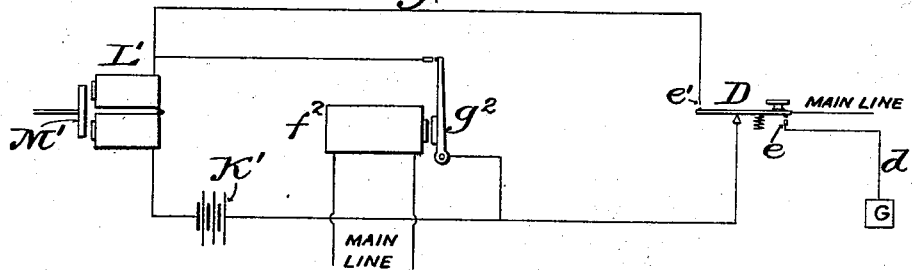

Fig. 5 illustrates an arrangement of circuits, whereby I am enabled to print both at the distant station and at the local or sending station. In this figure the key-lever D is represented as completing the working circuit through contact between said lever and the contact point $e$, as before, and also closing a local circuit through the medium of a contact point $e'$. The local circuit includes a local battery K', in which are placed the coils of an electro-magnet L', which, when energized, attracts the armature M', controlling one of the printing levers or type-bars of the local printing machine. Each key or lever D controls the local circuit of a separate and distinct type-bar or printing lever, but in this, as also in the instruments E indicated in Fig. 1, it is possible, and in fact, advisable to employ a single cell or a single group of cells as the local battery for each and all of the relays I of the series used in the machine, this being done by carrying branch conductors from such cell or group of cells to the make-and-break devices of each relay. The separate batteries are indicated in Fig. 1 merely for convenience of illustration.

Returning to Fig. 5, $f^2$ indicates an electro-magnet, one of a series included in a main line or circuit from a distant station and arranged in the same manner as the electro-magnets of the relays I in the instrument E shown in Fig. 1, so that each electro-magnet shall be selected according to the particular character intended to be printed in response to the actuation of its controlling key at the distant station.

Upon the energizing of the electro-magnet $f^2$, Fig. 5, its armature $g^2$, is attracted and a local circuit is completed, which includes the battery K' and electro-magnet L' before referred to, the cores of the electro-magnet L' being thereby caused to attract the armature M', and this in turn causing the particular type-bar or lever selected to be actuated and to print its appropriate character.

Figure 6:
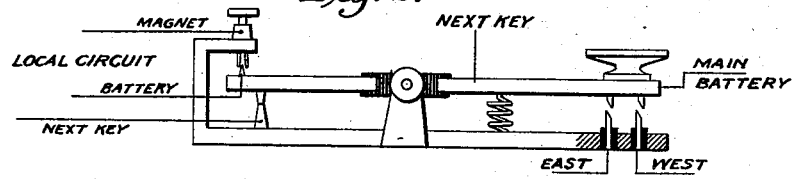

Fig. 6 illustrates a form of key designed to simultaneously close a local circuit and cause the printing of the characters on the local instrument, and to close two independent circuits to distant points designated in the drawing as east and west. Any suitable form of contacts may be adopted in lieu of those indicated in Fig. 6, that represented at the rear end of the lever being a very satisfactory one in practice. The paths for the main and local circuits are indicated in said figure sufficiently to enable them to be readily understood.

Figure 7:
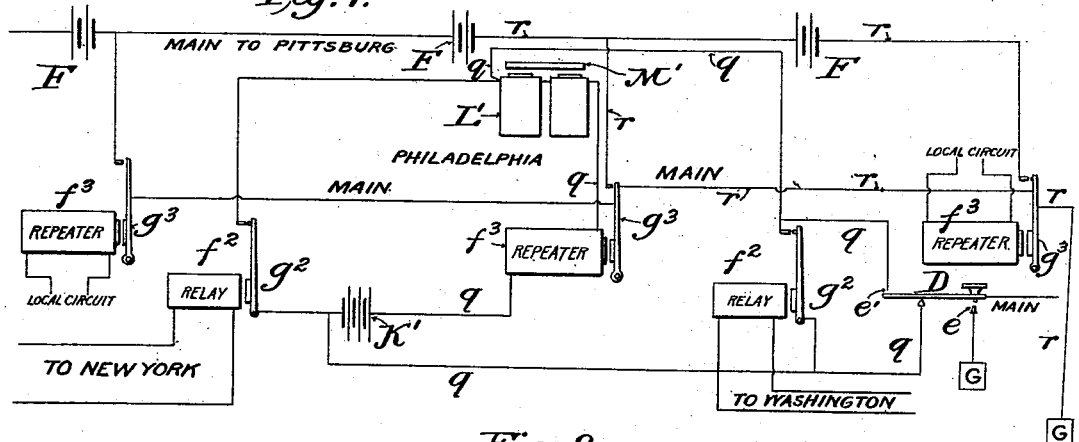

Fig. 7 illustrates an arrangement of circuits at an intermediate station, whereby a message received at that intermediate station from either side, may be repeated or transmitted, by means of repeater $f^3$, to a side station on a separate line.

For convenience of illustration it may be assumed that the intermediate station is Philadelphia, on a line extending from Washington to New York. Fig. 7 shows that a message coming from either Washington or New York will be, by means of the repeater, automatically transmitted to Pittsburg on a separate wire. In said figure, D indicates the sending key or lever of a Philadelphia station, which is arranged as in Figs. 1, 2 and 5; that is to say, that its depression shall cause contact to be made with the point $e$, and the proper number of cells thereby sent to line or thrown into circuit to call up the desired character at a distant station. At the same time, its rear end makes contact with a point $e'$ which closes a circuit $q$ including electro magnets L', local battery K', and electro-magnet $f^3$ of a repeater. The electro-magnet L', when energized, attracts its armature M', which, as explained in connection with Fig. 5, actuates the particular type-bar or printing character of the local instrument. When the local circuit, including the battery K', is closed or completed, magnet $f^3$ of the repeater included in the local circuit becomes energized and attracts its armature $g^3$ which is included in the main, $r$, the same combination and arrangement of local batteries, electromagnets and repeaters being provided for each key-lever of the series, but the batteries not necessarily being duplicated because of the possibility of carrying branch connections from a given cell or group of cells to the different relays as before explained, and as illustrated in Fig. 7, the several armatures $g^3$ are connected by a conductor, so that the exhaust current may pass from the ground through said conductor to the armature $g^3$ which is at the time attracted, and thence to the main line, $r$, which includes the cells or groups of cells F in the same manner as the circuit is established through the connection of the levers or keys D in Fig. 1,—the last armature $g^3$ of the series terminating the passage for the exhaust, except when said last armature is attracted and brought into contact with the branch going to the main line which passes to the next station or to the distant station.

For the purpose of enabling the local printing instrument at the station indicated in Fig. 7 to be actuated and caused to print, and also to transmit or permit the transmission of the same message to a station or stations beyond, there is provided for each local circuit containing an electro-magnet L' and battery K' a relay $f^2$ of the same construction, and arranged to operate in the same manner as the relay indicated in Fig. 5; that is to say, upon the actuation of a given key at a distant station, the particular relay $f^2$ at the station represented in Fig. 7 will have its electro-magnet energized and will thereupon attract its armature $g^2$ which will close the local battery circuit, cause the electro-magnet L' therein to be energized, and the armature M' thereof to be attracted, thus insuring the actuation of the particular type-bar or printing device controlled thereby. At the same time, the repeater $f^3$, of the said local circuit, will have its electro-magnet energized, and will attract its armature $g^3$, thereby completing the circuit through the main $r$, and calling into action all the cells or groups of cells in said main beyond the particular repeater called up or energized, and thus there will be sent over the main, $r$, the proper current to call up at a side station distant from the one represented in Fig. 7, the particular printing character or type-bar which is called up in the local station represented.

It will be noted upon examining Fig. 7, representing a station designated as Philadelphia, for convenience, that there are two relays, $f^2, f^2$, each controlling the local circuit above described, both of said relays being represented as in a line extending from Washington to New York; the repeaters in a side line connecting with Pittsburg.

Figure 8:
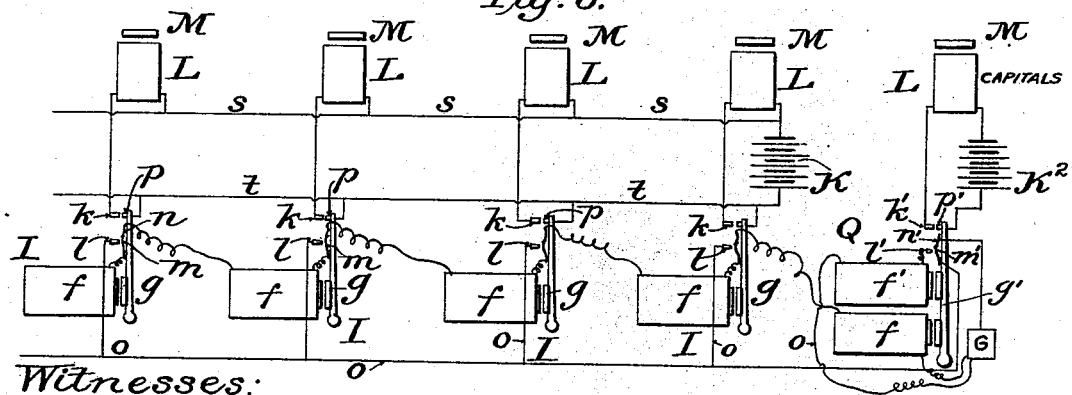

In Fig. 8 I have represented an arrangement of battery connections and circuits, whereby I am enabled to use a single cell or group of cells for the local circuits of the various relays I. In said figure, K indicates the local battery common to the different relays. From one pole of said battery, a conductor $s$ passes to and makes connection with one end of the coil of each of the electro-magnets L, with the exception of that one which controls the shifting device, whereby capital letters are caused to be printed,—for which electro-magnet a special battery $K^2$ is provided, because it is necessary frequently to hold the shifting carriage in its shifted or capital-printing position, while several keys are manipulated, and a corresponding number of characters printed. From the opposite pole of the battery K a second conductor, $t$, passes by and makes electrical connection with each of the armatures $g$, of the several relays, with the exception of that one belonging to the shifting device or capital-printing relay indicated as such in said Fig. 8. From this arrangement it will be readily understood that upon the energizing of any one of the electro-magnets, $f$, its armature will cause the contact points $k$ and $p$ to come together, and the local circuit from battery K to be completed through the conductor $s$, electro-magnet L, contact points $k$ and $p$, and conductor $t$ back to battery. The capital printing or shifting device in said Fig. 8 will be constructed and arranged to operate in precisely the same manner as that illustrated in Fig. 3, and explained in connection therewith.

Figure 9:
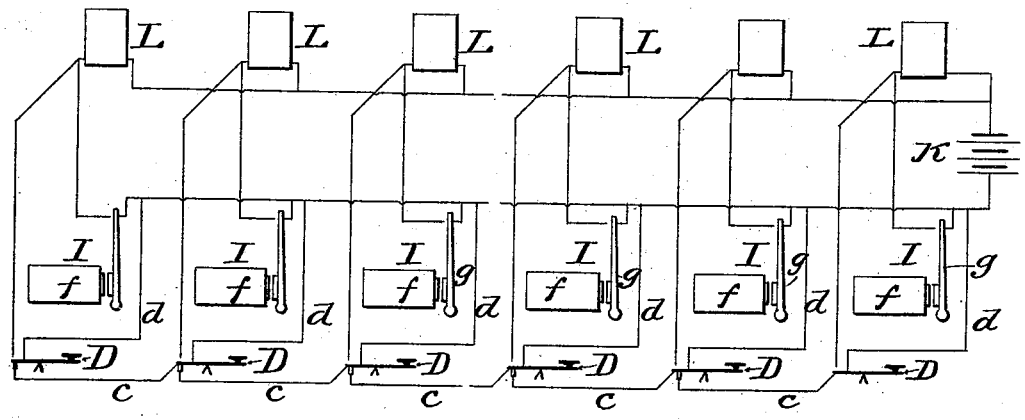

Fig. 9 illustrates the manner of connecting the keys D, the relays $f$ and the electro-magnets L, so that a single local battery shall control the several relays and the several local printing characters or type-bars; or, in other words, it illustrates the construction shown in Fig. 5, with the several connections to the one local battery.

Figure 10:
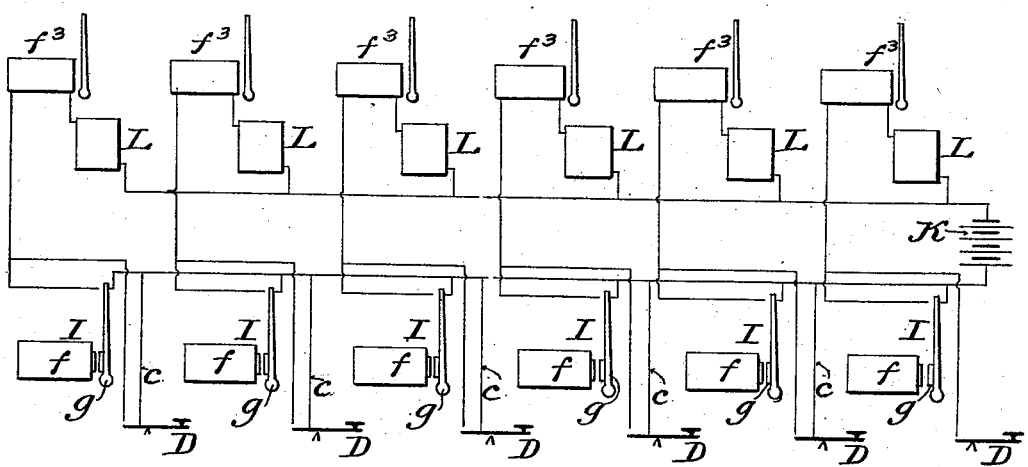

Fig. 10 represents the same arrangement of circuits or connections as is shown in Fig. 9, but with the repeaters $f^3$, of Fig. 7 included in the local circuits so as to cause the message to be transmitted to a distant station, as well as printed upon the local printing instrument, or with the use of a single local battery for energizing the relays and repeaters of the station represented in said figure.

Figure 11:
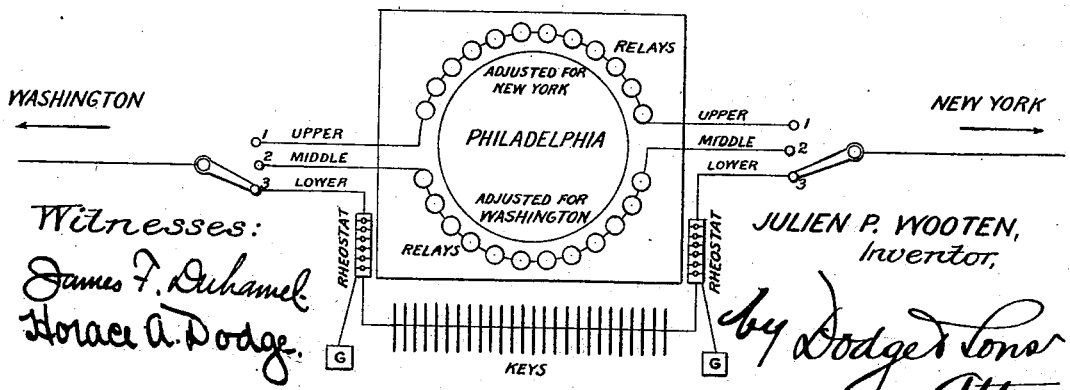

Fig. 11 represents a printing instrument at a given intermediate station with connections to and from the same from different directions, the arrangement being designed to permit the sending of messages from the station indicated in either direction, as well as the printing of the matter at the station represented; and the receipt of messages and the printing thereof upon the instrument at the station represented from the stations at either side of the one represented. For this purpose a multiple switch is provided at each side of the printing instrument at the intermediate station, which in said Fig. 11, is designated as Philadelphia for convenience, the one to the left being designated Washington, and the one on the right, New York. As indicated in said Fig. 11, the local printing instrument comprises two sets of relays, each set adjusted with reference to the distance from the intermediate station (Philadelphia) to the station right or left, so that no special adjustment or readjustment will be necessary in order to enable the printing instrument to be operated from either of the outlying stations under ordinary circumstances. In said Fig. 11, which as above stated represents an intermediate station, it will be seen that a rheostat is placed in the main line on either side of the sending keys or keyboard. This is for the purpose of avoiding the necessity of changes in adjustment of the different receiving relays in the line when different stations are sending. Thus, for instance, assuming that the line extends from Washington to New York, and that the station represented in said figure be Philadelphia with Washington on the left and New York on the right, sufficient resistance is placed in the rheostat on the left to equal the resistance in the line extending from Philadelphia to New York, thus making the power of the current reaching Washington when Philadelphia is sending equivalent to that reaching Washington when New York is sending; while in the rheostat on the right sufficient resistance may be put in to equal the resistance in the line between Philadelphia and Washington so that the strength of the current reaching New York when Philadelphia is sending is equal to that which reaches New York when Washington is sending.

Referring again to Fig. 11, the matter may be followed out in connection with the circuits and adjustments therein indicated. For convenience of explanation we may assume, arbitrarily, that three hundred represents the total line resistance between New York and Washington; one hundred and twenty the total line resistance between New York and Philadelphia; and one hundred and eighty the total line resistance between Washington and Philadelphia. Obviously, a given current passing over these different lengths of line or through these different resistances would have correspondingly different degrees of efficiency, and would differently affect relays of given winding or given mechanical resistance. Therefore, in order that the Philadelphia receiving instrument may properly respond to the signals from New York,—which current is also to operate the Washington instrument when required,—the Philadelphia instrument has one set of relays, the upper set in Fig. 11, adjusted to offer a resistance greater by one hundred and eighty than would be necessary or proper for the Washington instrument, as signified by the legend "Adjusted for New York," appearing in said Fig. 11. Therefore, when the Philadelphia instrument is to receive from New York, the circuit will be completed through the upper line, Fig. 11, by placing the switches upon the contacts numbered 1. Similarly, the receiving instrument at Philadelphia has a second set of relays, the lower set in Fig. 11, adjusted to offer a resistance greater by one hundred and twenty than would be necessary or proper for the New York instrument, as indicated by the legend: "Adjusted for Washington," in said figure. When Philadelphia is to receive from Washington, the middle line will be placed in circuit by placing the switches upon the contacts numbered 2. Thus it will be seen that the Philadelphia instrument will properly respond to signals from two points at different distances from Philadelphia, both sending a like strength of current to line.

It will be remembered that the current upon entering the receiving instrument and actuating the particular relay intended, is grounded back to the sending station. Hence the resistance of the line beyond is not encountered, and from this condition arises the necessity of the differing adjustments of the two sets of relays in the intermediate instrument. To send from the Philadelphia instrument to New York and to Washington with the same strength of current and with receiving instruments at the two distant points adjusted alike, it is obviously necessary to make the resistance between Philadelphia and New York, and between Philadelphia and Washington equal to the resistance between New York and Washington; or, in other words, the current reaching Washington from Philadelphia when Philadelphia is sending, must be the same as the current reaching Washington when New York is sending; and the current reaching New York when Philadelphia is sending must be the same as the current reaching New York when Washington is sending. Assuming then that Philadelphia desires to send a message to the right hand side of the Philadelphia instrument, and consequently between Philadelphia and New York: the switch at New York will be placed upon the contact 3, and the line will be grounded at the rheostat at the left hand of the Philadelphia instrument $b$, the ordinary grounding adjustment of the rheostat plugs, or in any usual way; and there will be introduced into the lower line, Fig. 11, by the rheostat at the right, a resistance greater by sixty than if Philadelphia were sending to Washington. Assuming that the current supplied to the Philadelphia sending instrument or controlled by its key board be the same in strength as that sent to line by the New York and Washington instruments, the resistance thus introduced in or by said right hand instrument between Philadelphia and New York will be represented by one hundred and eighty, so that, with the resistance of the line between Philadelphia and New York represented by one hundred and twenty, there will be in the line between the sending instrument at Philadelphia and the receiving instrument at New York, a resistance of three hundred, or the same as between the Washington and New York instruments.

If Philadelphia desires to send to Washington, the line is grounded at the right hand rheostat and a resistance represented by one hundred and twenty is introduced into the line by the left hand rheostat, which, together with the line resistance of one hundred and eighty between Philadelphia and Washington, makes a total resistance in the line between those points of three hundred. Thus it will be seen that without modification of adjustment the New York instrument will respond equally well to the Washington and Philadelphia transmissions, and that the Washington instrument will similarly receive, without readjustment, signals from Philadelphia and New York. The two switches and their contacts 1, 2, and 3 are located on opposite sides of the intermediate instrument, represented in Fig. 11 as the Philadelphia instrument, and are under the control of the operator at that point. Hence a single wire is sufficient from each switch to the distant station at that side on which such switch is located.

In the foregoing description nothing has been said as to the return of the carriages of the printing instruments to their initial or starting points preparatory to the printing of each new line, a provision which is necessary if the ordinary construction of printing machine or type-writing machine be followed, or the carriage be made to move back and forth across the paper as is contemplated in the foregoing description. In Fig. 12 I have represented a mechanism designed to serve this purpose, but I desire to say in connection therewith that it merely illustrates one of many forms which may be adopted, and this in a simple shape.

Q' indicates the rear side of the carriage frame of the printing machine, and R a strap or band passing to the spring drum S by which the carriage is drawn forward at the stroke of either letter or space key.

T indicates a local battery in the circuit of which is contained an electro-magnet U and a normally open circuit closer V.

W indicates a shaft located at the end of the machine opposite that at which the drum S is located, and bearing a drum S' upon which is wound a strap R' serving, upon the application of power to the shaft W, to draw the carriage frame Q' backward or to its starting point against the force exerted by the spring drum S.

X indicates a clutch, one member of which is fast to or integral with the drum S', and the other member of which is secured to or made integral with a combined ratchet wheel and drum Y.

Z represents a sliding frame or yoke one end of which is attached to and adapted to move the winding drum S' longitudinally upon the shaft W, and to carry the member of the clutch connected with said drum into or out of engagement with the other member of said clutch. The frame, Z is normally drawn lengthwise by a spring or equivalent means in the proper direction to disconnect the two parts of the clutch X, and to draw into engagement with the ratchet wheel Y a tongue or dog Z' by which the ratchet wheel and drum are prevented from rotating. The end of the frame Z farthest from the drum S' constitutes an armature or keeper for the electro-magnet U by which it is attracted whenever the circuit of the battery T is completed and the magnet energized.

a' and b' represent two levers connected by a rod or wire c', the lever a' being arranged directly in the path of the carriage Q' and in position to be struck and moved forward thereby as the carriage completes its travel in the printing of a line, and is of such form as to bear upon and throw downward the spring arm of the circuit closer Z and complete the circuit whenever a line of printing is completed. The arm b' is raised to a vertical position by the outward or downward movement of the arm a', and consequently stands in position to be struck or moved outward or downward by the carriage Q' upon its return to its initial position or starting point.

Upon the completion of the circuit of battery T through the action of the carriage Q' upon the circuit closer as the carriage reaches the limit of its travel, the electro-magnet U is energized, and attracting its keeper or armature draws the frame or slide Z longitudinally toward poles, thereby withdrawing the dog or tongue Z' from the ratchet wheel Y and moving drum S' laterally, so as to bring the two parts of the clutch X into engagement. The ratchet wheel and drum Y being thus released from tooth Z' are made subject to the action of a weight carried by cord wound upon said drum in a direction to turn said drum and the drum S' backward and thereby to cause the return of the carriage Q' to its starting point. When the carriage reaches its starting point it throws outward or downward the arm b', raises the arm a' and permits the circuit closer V to open and break the circuit, thus de-energizing the electro-magnet U and permitting the frame Z to move longitudinally under the action of the spring and disconnect the two parts of the clutch X and at the same time to carry the tongue Z' into engagement with the ratchet wheel Y and prevent the further descent of the weight.

The drum should carry a sufficient length of cord or should be so geared as to enable the weight to operate to return the carriage a large number of times, which may be easily effected by a proper train of gear and a sufficiently heavy weight. It is manifest, however, that any equivalent mechanism may be employed to return the carriage.

It is manifestly immaterial what the source of electric energy may be, provided only that the keys be constructed and arranged to send to line, each its proper strength of current, substantially as set forth. The term "battery" is, therefore, to be understood as comprehending any common and well known source of electric energy.

Having thus described my invention, what I claim is—

1. In a telegraph apparatus, the combination of a group of keys or levers electrically connected in series, a printing instrument provided with relays, each having its armature provided with a mechanical resistance differing from that of the others, said relays being connected in series; and each adapted when actuated, to divert the working circuit from such relay onward, a line or conductor connecting the last of the group of levers with the relay having the highest armature resistance, cells or groups of cells connected in series and each having an independent conductor extending into the path of movement of its controlling key or lever, and a ground connection between the last of the cells and the last of the relays, substantially as described and shown, whereby the depression of any one of the levers is caused to send to line a current of proper strength to overcome the armature resistance of the particular relay to be selected and to cut out all succeeding relays.

2. In combination with a printing instrument provided with a number of relays connected in series, each relay having its armature adjusted to a different mechanical resistance, and adapted, when actuated, to divert the current from such relay onward; and the last relay of the group connected with the ground or with a return line, a number of cells or groups of cells connected in series, a number of keys or levers connected in series with the relays, and each adapted when depressed to complete a circuit through the intervening keys and relays and through the cells or groups of cells intervening between the lever depressed and the relays,—whereby a current is sent to line exactly proportionate to the resistance offered by the relay to be selected.

3. The combination with a telegraphic printing instrument comprising a number of relays connected in series and having their armatures adjusted to offer differing mechanical resistances,—of a ground connection, and a circuit maker and breaker, one for each relay armature, adapted to send to ground the current delivered to the selected relay, and thereby to cut off all relays beyond the one selected.

4. In a telegraph apparatus, the combination of a series of keys or levers D, electrical conductors $c$, connecting said levers in series, a printing instrument E comprising a series of relays I, each having its armature adjusted to offer a different mechanical resistance, said relays being connected in series, a line or conductor $a$, connecting the last of the key levers with the relay having the highest armature resistance, cells or groups of cells F connected in series, and each having a separate contact point through which the circuit may be completed by one of the keys or levers D,—and a circuit breaker carried by each of the relay armatures and adapted to complete a ground connection from the relay actuated, to the last of the battery cells.

5. In a telegraph apparatus, substantially such as described, a relay I comprising an electro-magnet $f$, an armature $g$ carrying contact springs, $m$, $n$, normally in contact, the former electrically connected with one end of the helix of the electro-magnet $f$, a grounded contact point $l$, arranged in the path of the contact spring $m$, and adapted to cause the separation of the fingers $m$ and $n$ when the armature is attracted, a local battery K, an electro-magnet L placed in the circuit of said local battery, a type-bar or printing lever J, an armature M controlled by the electro-magnet L and serving to actuate the type-bar or printing lever J, and contact points $k$, $p$, the latter carried by the armature $g$, whereby the local battery circuit is completed and the main circuit is grounded when the electro-magnet $f$ is energized.

6. In a telegraphic printing apparatus, substantially such as described, the shifting instrument Q comprising electro-magnets $f$ and $f'$, armature $g'$ carrying insulated spring fingers $m'$ and $n'$, and contact points $p'$, local battery K, electro-magnet L placed in the circuit of local battery K, armature M and contact point $l'$ arranged in the path of the spring finger $m'$, whereby when the armature $g'$ is attracted the exhaust current is caused to pass through the helix of electro-magnet $f'$ and thence to the ground and thereby to maintain the closure of the local battery circuit as long as desired.

7. The combination of a local key-board and source of electric energy, the respective keys of the key-board being adapted to send to line each a different strength of current, a distant printing instrument provided with relays of differing mechanical resistance, and each adapted when actuated, to cut out all succeeding relays; and a line or conductor connecting the key-board and the printing instrument; substantially as set forth.

8. In combination with sending and receiving printing instruments at two separated stations and at an intermediate station the instrument at the intermediate station being provided with two sets of relays each set adjusted for a different one of the side stations, a main line connecting the three stations, a three-way switch at either side of the intermediate station, and rheostats, one at either side of the intermediate station whereby the current sent from the intermediate to either side station may be made of the precise strength required, substantially as and for the purpose set forth.

9. In combination with an electrical printing instrument substantially such as described, comprising type-bars and armatures, relays for attracting said armatures, and keys for closing the working circuit, sending proper current to line to select the desired relay, and short circuit succeeding relays, a relay provided with two electro-magnets, one in the working circuit and the other in the exhaust or return circuit; and a platen shifting device in the printing instrument controlled by said relay, whereby the machine may be adjusted and kept for any desired length of time in adjustment for the printing of capitals.

10. In combination with two printing instruments substantially such as described comprising relays, adapted each to actuate one printing character and cut out succeeding ones battery cells, &c., a series of keys; each adapted to simultaneously close the working circuits of the relays of both instruments.

11. In combination with two printing instruments substantially such as described, comprising relays, adapted each to actuate one printing character and to cut out all others, battery cells, &c., a series of keys having multiple contacts and adapted each to close the working circuits of the several instruments simultaneously.

12. In combination with two separated stations each provided with a printing instrument of the character explained,—an intermediate station having a like printing instrument provided with independent sets of relays; a three point switch at each side of the intermediate station for directing the current through either set of relays or around both; and rheostats placed in the by-path circuit at each side of the intermediate instrument.

13. The herein described apparatus for electric communication, comprising the following elements in combination: a series of relays each having its armature adjusted to offer a different mechanical resistance to the attraction of its magnet from that offered by the others of the series; means for causing any given relay when actuated to break the circuit of relays beyond it; means for thereby causing a short circuit for an operating current; a local circuit containing an actuating magnet arranged to be actuated upon the actuation of the selected relay; and means for passing to line a current of desired strength.

14. In combination with printing instrument such as described, and with a series of keys D adapted to close the main working circuits, a series of repeaters $f^3$, and a series of relays I, all arranged substantially as described and shown; whereby the closing of the circuit by the key D is followed by printing on the local instrument and on distant instruments located at different and separated points.

In witness whereof I hereunto set my hand in the presence of two witnesses.

JULIEN P. WOOTEN.

Witnesses:
HORACE A. DODGE,
WALTER S. DODGE.